(12) United States Patent
Shibata

(10) Patent No.: US 8,402,299 B2
(45) Date of Patent: Mar. 19, 2013

(54) ELECTRONICS DEVICE HAVING TIMEKEEPING FUNCTION AND COMPUTER-READABLE RECORD MEDIUM STORING PROGRAM FOR TIMEKEEPING FUNCTION

(75) Inventor: Hiroshi Shibata, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 726 days.

(21) Appl. No.: 12/566,725

(22) Filed: Sep. 25, 2009

(65) Prior Publication Data
US 2010/0083024 A1  Apr. 1, 2010

(30) Foreign Application Priority Data
Sep. 30, 2008 (JP) .................................. 2008-254035

(51) Int. Cl.
*G06F 1/14* (2006.01)
(52) U.S. Cl. ........................ 713/400; 358/409; 368/59
(58) Field of Classification Search .................. 358/409; 368/46, 59; 702/178; 713/400
See application file for complete search history.

(56) References Cited

U.S. PATENT DOCUMENTS

| | | |
|---|---|---|
| 2003/0014678 A1 | 1/2003 | Ozcetin et al. |
| 2003/0093705 A1 | 5/2003 | Kriz et al. |
| 2004/0114156 A1 | 6/2004 | Azami |
| 2004/0141201 A1 | 7/2004 | Shima |
| 2006/0217918 A1 | 9/2006 | Andrianov |

FOREIGN PATENT DOCUMENTS

| | | |
|---|---|---|
| JP | 2001-080167 | 3/2001 |
| JP | 2001-289981 | 10/2001 |
| JP | 2003-207586 | 7/2003 |
| JP | 2004-188793 | 7/2004 |
| JP | 2004-264992 | 9/2004 |
| JP | 2006-172030 | 6/2006 |

OTHER PUBLICATIONS

European Search Report for application No. 09252244.0 dated May 3, 2011.
Notification of Reasons for Rejection in corresponding Japanese Application No. 2008-254035 mailed on Aug. 3, 2010.
European Search Report Application No. 09252244.0; Mailed Feb. 5, 2010.

*Primary Examiner* — Albert Wang
(74) *Attorney, Agent, or Firm* — Banner & Witcoff, Ltd.

(57) ABSTRACT

An electronics device comprising a time information acquisition unit which acquires time information representing present time from an external device, an update unit which updates reference time stored in a reference time storage unit to time represented by the latest time information acquired by the time information acquisition unit each time the time information is acquired, a counter circuit which is formed by hardware and updates its count value at fixed cycles, an elapsed time measurement unit which measures an elapsed time since the update of the reference time by use of the counter circuit, a present time calculation unit which calculates present time by adding the elapsed time to the reference time stored in the reference time storage unit, and a response unit which makes the present time calculation unit calculate the present time and outputs the calculated present time if a present time output request is issued.

17 Claims, 7 Drawing Sheets

ELECTRONICS DEVICE HAVING TIMEKEEPING FUNCTION AND COMPUTER-READABLE RECORD MEDIUM STORING PROGRAM FOR TIMEKEEPING FUNCTION

CROSS-REFERENCE TO RELATED APPLICATION

This application claims priority under 35 U.S.C. §119 from Japanese Patent Application No. 2008-254035 filed on Sep. 30, 2008. The entire subject matter of the application is incorporated herein by reference.

BACKGROUND

1. Technical Field

The present invention relates to an electronics device having a timekeeping function (clock function) and a computer-readable record medium storing a program for implementing the timekeeping function.

2. Related Art

Electronics devices equipped with an RTC (Real Time Clock) circuit are widely known and used today. The RTC circuit, which is supplied with electric power from a battery and keeps on operating even when the power of the electronics device is OFF, is a circuit for keeping the present time.

Further, there exists an electronics device which acquires time information from an external device by communication, determines the present time (at the point of the acquisition of the time information) using the acquired time information, and thereafter keeps (determines) the present time (after the acquisition of the time information) by counting the elapsed time since the acquisition of the time information by software.

Such a software clock is generally implemented as a function of an operating system (OS), that is, implemented by a CPU (operated by the operating system) by executing the counting operation according to a clock signal inputted to the CPU.

There also exist electronics devices capable of correcting the progress of the time kept by a hardware clock (RTC circuit) or software clock based on correct time information acquired from an external device.

In recent years, environments enabling the acquisition of the time information from a time server (as the external device) via a network are being established with the prevalence of the Internet. Thus, for an electronics device connectable to a network, it is possible to keep on obtaining (determining) the present time (after the acquisition of the time information) by first determining the present time (at the point of the acquisition of the time information) using the time information acquired from the time server and thereafter measuring the elapsed time since the point of the determination as mentioned above, even without the need of being equipped with an RTC circuit.

SUMMARY

The timekeeping accuracy of a software clock is lower than that of a hardware clock (RTC circuit) since the progress of the time kept by the software clock changes depending on the processing load on the CPU. Further, there area cases where a signal outputted by the quartz oscillator is inputted to the CPU not directly but via a circuit for noise reduction called an "SSCG (Spread Spectrum Clock Generator)" which extends the frequency range of the signal. Also for this reason, the timekeeping accuracy of a software clock is lower than that of an RTC circuit performing the timekeeping operation by receiving the signal outputted by the quartz oscillator.

However, equipping an electronics device with an RTC circuit involves problems such as enlargement of the circuit scale and increase in the manufacturing cost of the electronics device.

The present invention, which has been made in consideration of the above problems, is advantageous in that a technology which makes it possible to implement an electronics device having an accurate timekeeping function (capable of accurately determining the present time) in a simple configuration, in a reduced circuit scale and at a low cost can be provided.

An electronics device in accordance with the present invention (which has been made to achieve the above objective) determines the present time not by using an RTC circuit but by using the time information acquired from an external device and a counter circuit which is formed by hardware.

In accordance with an aspect of the present invention, there is provided an electronics device comprising a time information acquisition unit which acquires time information representing present time from an external device, a reference time storage unit which stores and holds reference time, an update unit which updates the reference time stored in the reference time storage unit to time represented by the latest time information acquired by the time information acquisition unit each time the time information is acquired by the time information acquisition unit, a counter circuit which is formed by hardware and updates its count value at fixed cycles, an elapsed time measurement unit which measures an elapsed time since the update of the reference time by use of the counter circuit, a present time calculation unit which calculates present time by adding the elapsed time measured by the elapsed time measurement unit to the reference time stored in the reference time storage unit, and a response unit which makes the present time calculation unit calculate the present time and outputs the calculated present time if a present time output request is issued.

In accordance with other aspects of the present invention, there is provided a computer-readable record medium storing computer-readable instructions that cause a computer to execute a time information acquisition step of acquiring time information representing present time from an external device, an update step of updating reference time stored in a reference time storage unit to time represented by the latest time information acquired by the time information acquisition step each time the time information is acquired by the time information acquisition step, an elapsed time measurement step of measuring an elapsed time since the update of the reference time by use of a counter circuit which is formed by hardware and updates its count value at fixed cycles, a present time calculation step of calculating present time by adding the elapsed time measured by the elapsed time measurement step to the reference time stored in the reference time storage unit, and a response step of calculating the present time by executing the present time calculation step and outputting the calculated present time if a present time output request is issued.

Incidentally, the present invention can be implemented in various forms, such as an electronics device, an electronics device control method, a computer program for controlling an electronics device, a storage medium storing the computer program, etc.

Other objects, features and advantages of the present invention will become more apparent from the consideration of the following detailed description taken in conjunction with the accompanying drawings.

BRIEF DESCRIPTION OF THE ACCOMPANYING DRAWINGS

DETAILED DESCRIPTION OF THE EMBODIMENT

Figure 1:
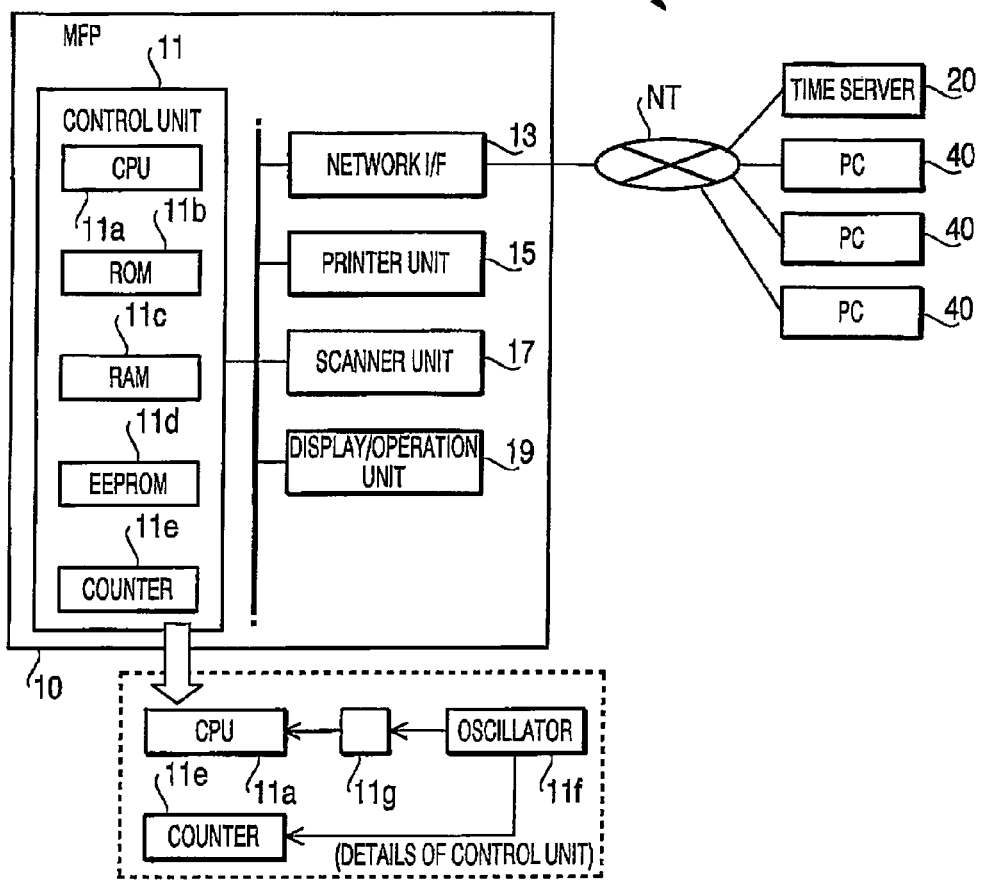
FIG. 1 is a block diagram showing the configuration of a communication system (including a digital MFP as an electronics device) in accordance with an embodiment of the present invention.

Referring now to the drawings, a description will be given in detail of a preferred embodiment in accordance with the present invention.

Referring to FIG. 1, a communication system 1 in accordance with an embodiment of the present invention includes a digital MFP (Multi-Function Peripheral) 10, a time server 20 and PCs (Personal Computers) 40 which are connected to a network NT.

The digital MFP 10 in the communication system 1 includes a control unit 11, a network interface 13, a printer unit 15, a scanner unit 17 and a display/operation unit 19.

The control unit 11 includes a CPU (Central Processing Unit) 11a which executes various programs, a ROM 11b storing the programs to be executed by the CPU 11a, a RAM 11c which is used as a work area during the program execution by the CPU 11a, an EEPROM (Electrically Erasable Programmable ROM) 11d which is used for storing a variety of setting information, a counter 11e, and a quartz oscillator 11f. The CPU 11a has centralized control of the whole device (MFP 10) by executing the programs stored in the ROM 11b, by which various functions of the MFP 10 are implemented.

The quartz oscillator 11f generates a clock signal which is necessary for the operation of the CPU 11a. The clock signal outputted by the quartz oscillator 11f is inputted to the CPU 11a and the counter 11e.

Incidentally, the clock signal for the CPU 11a is inputted to the CPU 11a after its frequency range has been extended by an SSCG (Spread Spectrum Clock Generator) circuit 11g as a circuit for noise reduction. On the other hand, to the counter 11e, the clock signal from the quartz oscillator 11f is inputted directly (not via the SSCG circuit 11g).

Thus, the frequency spectrum of the clock signal inputted to the counter 11e has a sharp peak at a single frequency, while that of the clock signal inputted to the CPU 11a has a certain width in frequency. For this reason, the counter 11e functions as a hardware clock unit capable of keeping the time more accurately than a software timer implemented by the CPU 11a.

Specifically, the counter 11e performs the counting operation by successively incrementing its count value C at fixed time intervals R according to the clock signal inputted from the quartz oscillator 11f.

The network interface 13, which is connected to the network NT, is configured to be capable of communicating with external devices (time server 20, PC 40, etc.) via the network NT.

The printer unit 15 forms (prints) an image on a sheet (e.g. paper) according to image data supplied from the control unit 11.

The scanner unit 17 optically scans a document (target of scanning) placed on a document table or fed from an ADF (Automatic Document Feeder) and thereby generates image data representing the scanned image. The image data generated by the scanner unit 17 is inputted to the control unit 11.

The display/operation unit 19, including an LCD (Liquid Crystal Display) monitor for displaying information and various operation keys, functions as a user interface.

The control unit 11 implements the so-called network printer function, scanner function and copy function by use of the printer unit 15, the scanner unit 17 and the display/operation unit 19.

For example, the control unit 11 implements the network printer function by receiving image data (target of printing) from a PC 40 on the network NT via the network interface 13 and inputting the received image data to the printer unit 15.

When a scan instruction is inputted by the user through the display/operation unit 19, the control unit 11 acquires image data (representing an image on a document) by making the scanner unit 17 scan the document and then transmits the acquired image data to a preset external device (destination) via the network interface 13 according to the setting information stored in the EEPROM 11d, by which the scanner function is implemented.

When a copy instruction is inputted by the user through the display/operation unit 19, the control unit 11 acquires image data (representing an image on a document) by making the scanner unit 17 scan the document and then inputs the acquired image data to the printer unit 15 to make the printer unit 15 form the copy image of the document on a sheet, by which the copy function is implemented.

Besides the above functions, the MFP 10 has a UTC clock function of acquiring time data representing the present time (UTC (Universal Time Coordinated)) from the time server 20 via the network interface 13, keeping the present time (UTC) based on the time data, and supplying the present time (UTC). Incidentally, the time server 20 receiving a time data request signal sends back the time data (representing the present time (UTC)) as a reply signal to the sender of the request signal.

Figure 2:
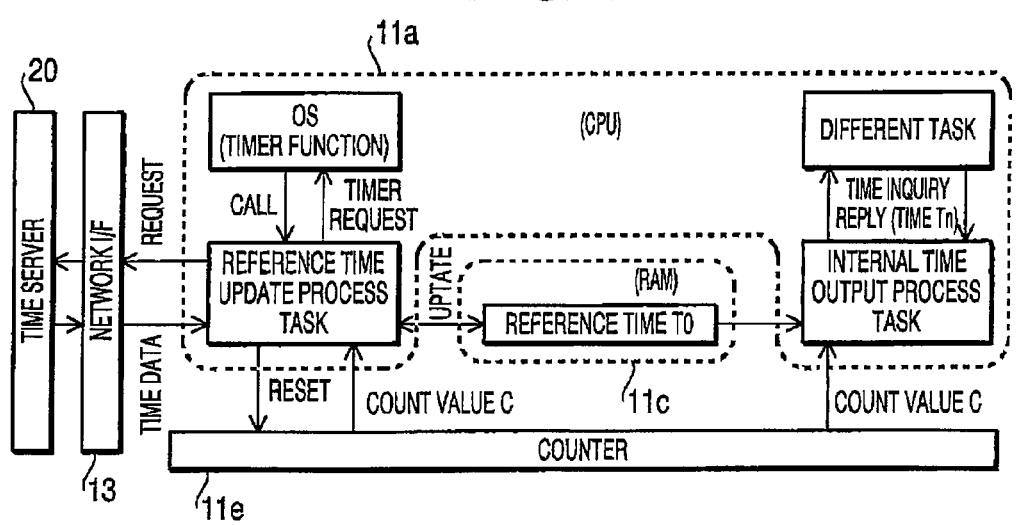
FIG. 2 is a functional block diagram showing the relationship among processes (tasks) executed by a control unit of the MFP for implementing a UTC clock function.

Processes executed by the control unit 11 for implementing the UTC clock function are shown in FIG. 2 as tasks. As shown in FIG. 2, the control unit 11 (operated by an operating system (OS) having a software timer function) implements the UTC clock function by executing a reference time update process (see FIG. 4) and an internal time output process (see FIG. 5) under the control of the OS.

In cases where a timer request is issued by a requester, the software timer function (implemented by the OS) calls up the requester when a time period specified by the timer request has passed since the issuance of the request. The software timer function is used in the reference time update process for determining the time for referring to the count value C of the counter 11e (i.e. for waiting for a waiting time before the reference to the count value C).

In the reference time update process, the time data is acquired from the time server 20 via network interface 13, reference time T0 held by the RAM 11c is updated to present time Ts represented by the acquired time data, and the elapsed time since the update of the reference time T0 is measured by the counter 11e by resetting its count value C to 0 on each update of the reference time T0.

Figure 3:
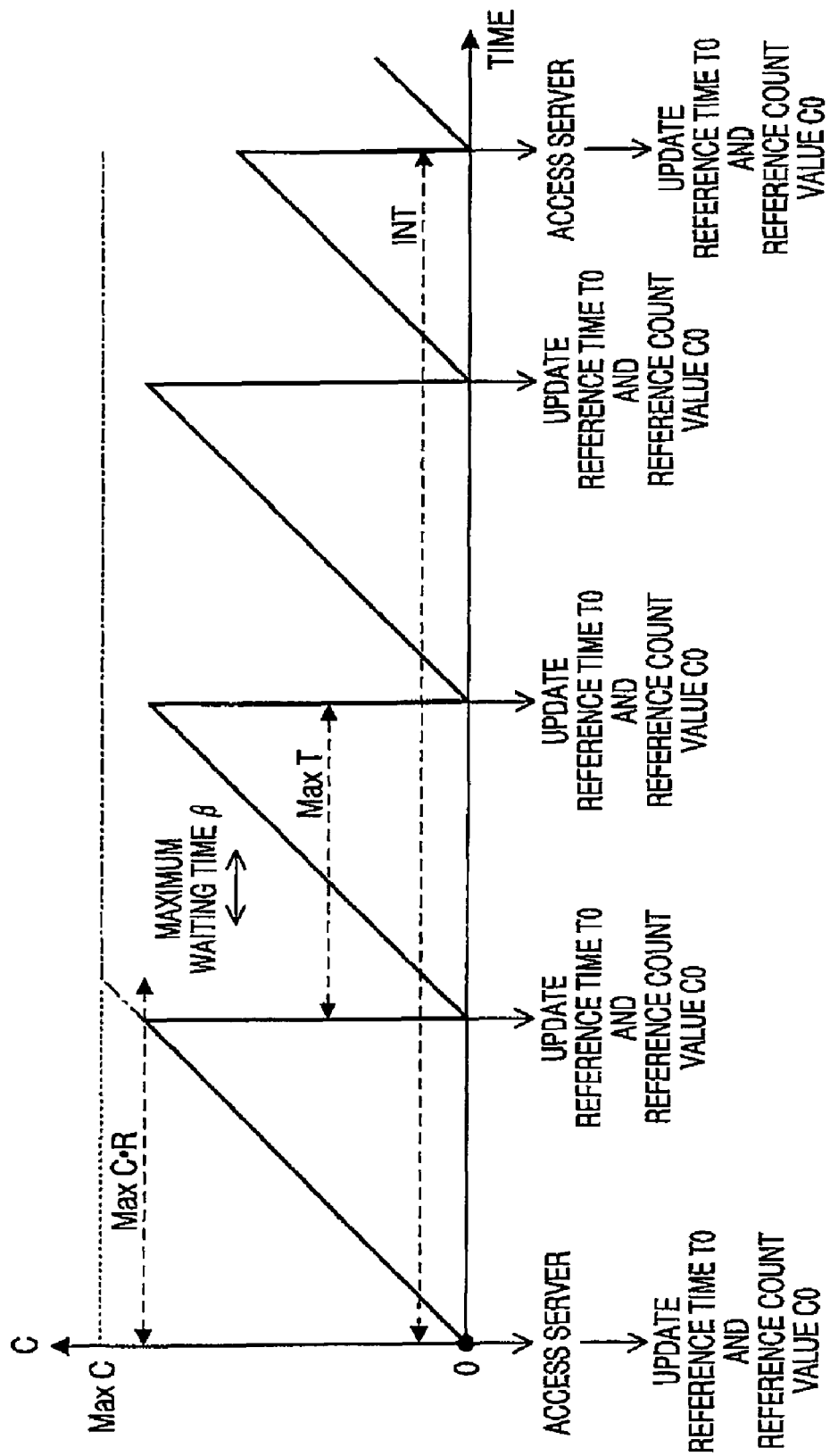
FIG. 3 is a graph showing the operation of a counter of the control unit and the update of reference time T0.

As shown in FIG. 3, in the reference time update process, the reference time T0 held by the RAM 11c is updated to the present time (determined by the reference time T0 and the count value C of the counter 11e) and the count value C is reset to 0 not only when the time data is acquired from the time server 20 but also each time a time interval MaxT (shorter than a maximum measurement time MaxC·R of the counter 11e) has passed.

The counter 11e measures the elapsed time since the resetting of the count value C by successively incrementing the count value C from 0 to MaxC at fixed time intervals R. Since the counter 11e is not a free-running counter, the counter 11e (count value C) generally reaches its maximum value when the maximum measurement time MaxC·R has passed since the resetting and then stops the counting operation at the point of the maximum value as indicated by a chain line in FIG. 3. The operation of the counter 11e being reset by the reference time update process and the update of the reference time T0 are shown in FIG. 3.

As shown in FIG. 3, the counter 11e is prevented from stopping the counting operation (incrementation of the count value C) in the reference time update process by successively resetting the count value C to 0 at the time intervals MaxT (shorter than the maximum measurement time MaxC·R).

By the reference time update process described above, the internal time output process is allowed to consistently calculate the present time Tn based on the reference time T0 and the count value C. Incidentally, the reference time update process and the internal time output process are executed in parallel by the control unit 11.

The internal time output process is executed when a time inquiry is issued by a different task. In the internal time output process, the present time Tn is calculated based on the count value C at the point of the time inquiry and the present time Tn stored in the RAM 11c, and information on the calculated present time Tn is outputted to the task (inquirer).

As the "different task", a task that performs Kerberos authentication can be taken as an example. The MFP 10 in this embodiment is configured to execute high-security communication with an external device (e.g. PC 40) on the network NT by performing the Kerberos authentication. The time (UTC) supplied by the UTC clock function is used for the Kerberos authentication, for example.

Figure 4:
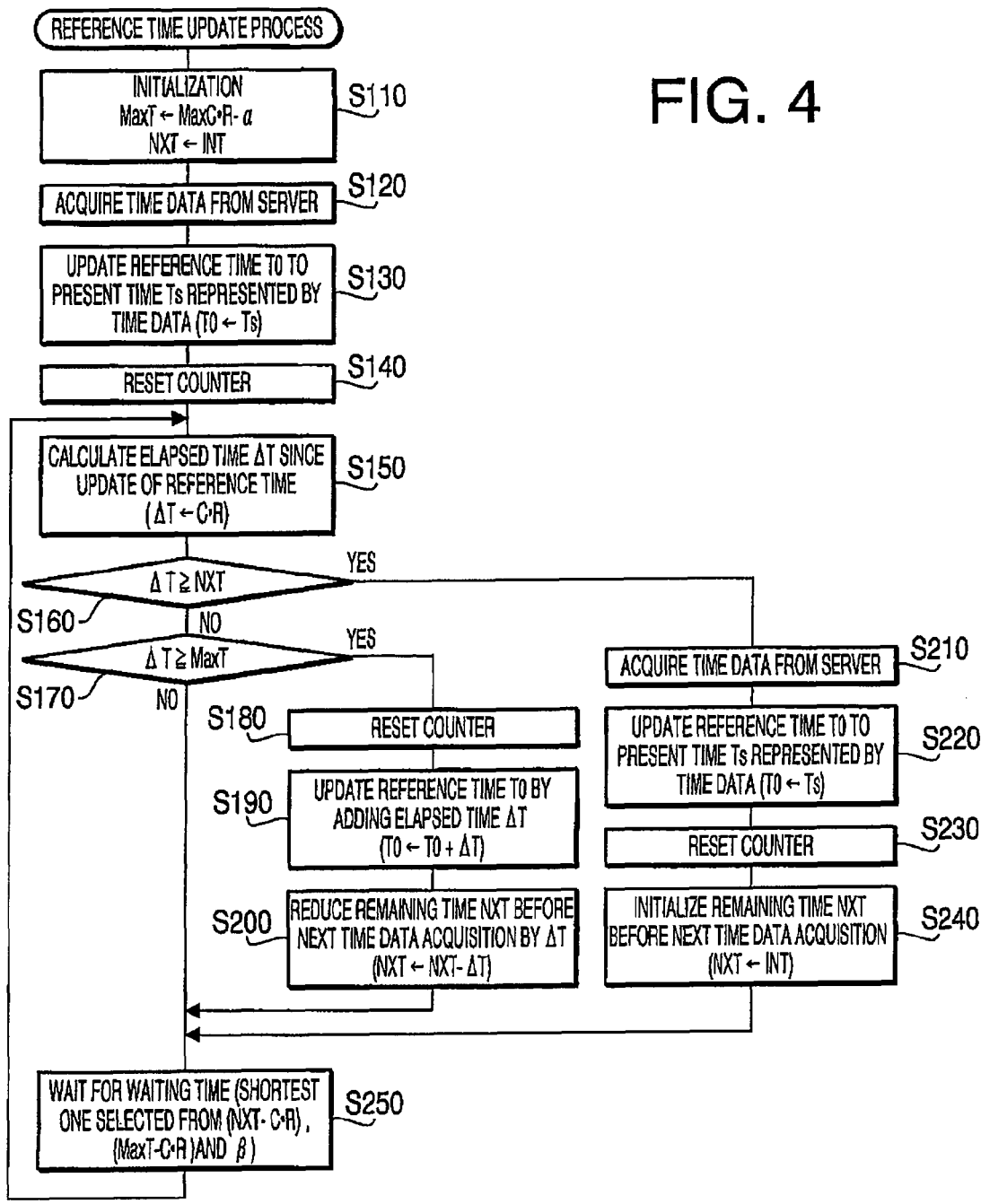
FIG. 4 is a flow chart showing a reference time update process which is executed by the control unit.

Next, the details of the reference time update process will be explained below referring to a flow chart of FIG. 4. The control unit 11 starts the reference time update process (FIG. 4) immediately after startup of the MFP 10.

At the start of the reference time update process, the control unit 11 initializes parameters (S110). Specifically, the control unit 11 initializes the time interval MaxT of the update of the reference time T0 to a value that is a time α shorter than the maximum measurement time MaxC·R (MaxT←MaxC·R−α) while also initializing a parameter NXT (representing a remaining time before the next time data acquisition from the time server 20) to a preset time INT (NXT←INT).

Incidentally, the time INT is a parameter representing the time interval of the time data acquisition from the time server 20. The set value of the time INT has previously been stored in the EEPROM 11d. The time α is previously set by a designer in consideration of the error of the software timer. While details will be explained later, the time α is set at a value with which the reference time T0 can be updated before the elapse of the maximum measurement time MaxC·R of the counter 11e even when an error has occurred in the software timer.

After finishing the initialization (S110) as above, the control unit 11 acquires the time data from the time server 20 via the network interface 13 (S120). Specifically, the control unit 11 transmits a time data request signal to the address of the time server 20 stored in the EEPROM 11d via the network interface 13 and thereafter receives the time data (sent back from the time server 20 as a reply signal) via the network interface 13.

After receiving the time data (S120), the control unit 11 updates the reference time T0 stored in the RAM 11c to the present time Ts represented by the received time data (S130), resets the counter 11e and makes the counter 11e start the update of the count value C from 0 (S140), and thereafter advances to step S150.

In the step S150, the control unit 11 refers to the count value C of the counter 11e and calculates the elapsed time ΔT since the update of the reference time T0 based on the count value C at the point of the reference and the aforementioned time interval R (incrementation cycle of the counter 11e) as below.

$$\Delta T \leftarrow C \cdot R$$

Subsequently, the control unit 11 judges whether or not the elapsed time ΔT is the remaining time NXT or more (S160). By this judgment, whether the time INT has passed since the previous time data acquisition or not can be judged.

If the elapsed time ΔT is less than the time NXT (S160: NO), the control unit 11 judges whether or not the elapsed time ΔT is the time MaxT or more (S170). By this judgment, whether the time MaxT has passed since the update of the reference time T0 or not can be judged.

If the elapsed time ΔT is less than the time MaxT (S170: NO), the control unit 11 advances to step S250. In the step S250, the control unit 11 refers to the count value C of the counter 11e, calculates a remaining time (NXT−C·R) before the next time data acquisition, calculates a remaining time (MaxT−C·R) before the next update of the reference time T0, determines a waiting time WT as the shortest one selected from the calculated remaining time (NXT−C·R), the calculated remaining time (MaxT−C·R) and a preset maximum waiting time β, and thereafter waits for the determined waiting time WT by use of the software timer of the OS.

Specifically, the reference time update process (task) requests (i.e. issues the timer request to) the software timer (OS) to call up the reference time update process when the determined waiting time WT has passed, and thereafter waits until a call corresponding to the timer request is received from the software timer (OS).

When the call from the software timer (OS) is received, the control unit 11 returns to the step S150, in which the control unit 11 newly refers to the count value C of the counter 11e and calculates the elapsed time ΔT since the update of the reference time T0 based on the count value C at the point of the reference and the incrementation cycle R of the counter 11e. Thereafter, the control unit 11 executes the subsequent steps.

Incidentally, the maximum waiting time β is set together with the aforementioned time α in consideration of the accuracy of the software timer. For example, assuming that a timer request requesting the software timer to call up the reference time update process in one hour is issued, the maximum waiting time β is set at one hour and the time α is set at one minute in cases where the calling event from the software timer (OS) occurs with a permissibly small error (with respect to the time (one hour) specified by the timer request) sufficiently less than one minute.

The maximum waiting time β is set at a value sufficiently less than the time INT and the time MaxT. For example, when the time INT is approximately twenty-four hours and the maximum measurement time MaxC·R of the counter 11e is approximately eight hours, the maximum waiting time may be set at approximately one hour.

When the time MaxT has passed (while the above process is executed) since the update of the reference time T0, the elapsed time ΔT is calculated in S150 as a time longer or equal to the time MaxT. Thus, the control unit 11 judges in S170 that the elapsed time ΔT is the time MaxT or more (S170: YES) and advances to step S180.

In the step S180, the control unit 11 resets the counter 11e and makes the counter 11e start the update of the count value C from 0. In the next step S190, the control unit 11 updates the reference time T0 stored in the RAM 11c by adding the elapsed time ΔT to the current value of the reference time T0 as below.

$$T0 \leftarrow T0 + \Delta T$$

By the step S190, the control unit 11 adjusts the reference time T0 to the time (UTC) of the resetting of the counter 11e.

Further, the control unit 11 updates the remaining time NXT (before the next time data acquisition from the time server 20) by subtracting the elapsed time ΔT from the current value of the remaining time NXT as below (S200).

$$NXT \leftarrow NXT - \Delta T$$

The remaining time NXT is updated as above because the starting point of the elapsed time ΔT (to be calculated thereafter) has been shifted by the step S190.

After finishing the step S200, the control unit 11 advances to the step S250 (waits for the waiting time WT as explained above) and thereafter returns to the step S150.

When the time NT has passed since the previous time data acquisition, the elapsed time ΔT is calculated in S150 as a time longer or equal to the remaining time NXT. Thus, the control unit 11 judges in S160 that the elapsed time ΔT is the remaining time NXT or more (S160: YES) and advances to step S210.

In the step S210, the control unit 11 acquires the time data from the time server 20 similarly to the step S120. After receiving the time data (S210), the control unit 11 updates the reference time T0 stored in the RAM 11c to the present time Ts represented by the received time data (S220), resets the counter 11e and makes the counter 11e start the update of the count value C from 0 (S230), initializes the remaining time NXT to the time INT (S240), and thereafter advances to the step S250.

By executing the above procedure, the control unit 11 makes it possible to determine the present time Tn based on the reference time T0 and the count value C until the next time data acquisition.

Figure 5:
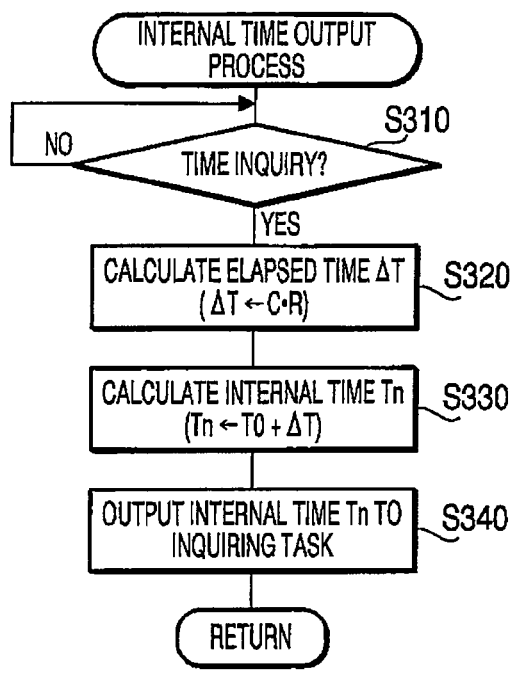
FIG. 5 is a flow chart showing an internal time output process which is executed by the control unit.

Next, the details of the internal time output process will be explained below referring to a flow chart of FIG. 5. The control unit 11 starts repeatedly executing the internal time output process (FIG. 5) immediately after startup of the MFP 10.

At the start of the internal time output process, the control unit 11 waits until the time inquiry is issued by a task (S310). When a time inquiry is issued (S310: YES), the control unit 11 refers to the count value C of the counter 11e and calculates the elapsed time ΔT since the update of the reference time T0 based on the count value C at the point of the reference and the incrementation cycle R of the counter 11e as below (S320).

$$\Delta T \leftarrow C \cdot R$$

Subsequently, the control unit 11 calculates the present time Tn (UTC) by adding the calculated elapsed time ΔT to the reference time T0 stored in the RAM 11c (S330) and outputs the calculated present time Tn to the inquiring task (S340). Thereafter, the control unit 11 which has finished the above internal time output process returns to the step S310 and waits until the next time inquiry is issued by a task.

Incidentally, while the UTC clock function implemented by the control unit 11 equipped with the counter 11e has been explained above assuming that the counter 11e is a resettable counter which stops the counting operation when its count value C (successively updated from the starting point (minimum value) to the endpoint (maximum value)) has reached the endpoint, the MFP 10 having the UTC clock function is desired to be configured as below in cases where the counter 11e is a free-running counter (non-resettable).

<Modification>

In the following, an MFP 10 in accordance with a modification of the above embodiment will be described referring to FIGS. 6-9. The MFP 10 as the modification is configured basically in the same way as the MFP 10 in the above embodiment except that the counter 11e is a free-running counter (non-resettable) and the reference time update process and the internal time output process executed by the control unit 11 are slightly different from those in the above embodiment. Thus, repeated explanation of common elements (already explained in the above embodiment) will be omitted properly.

Figure 6:
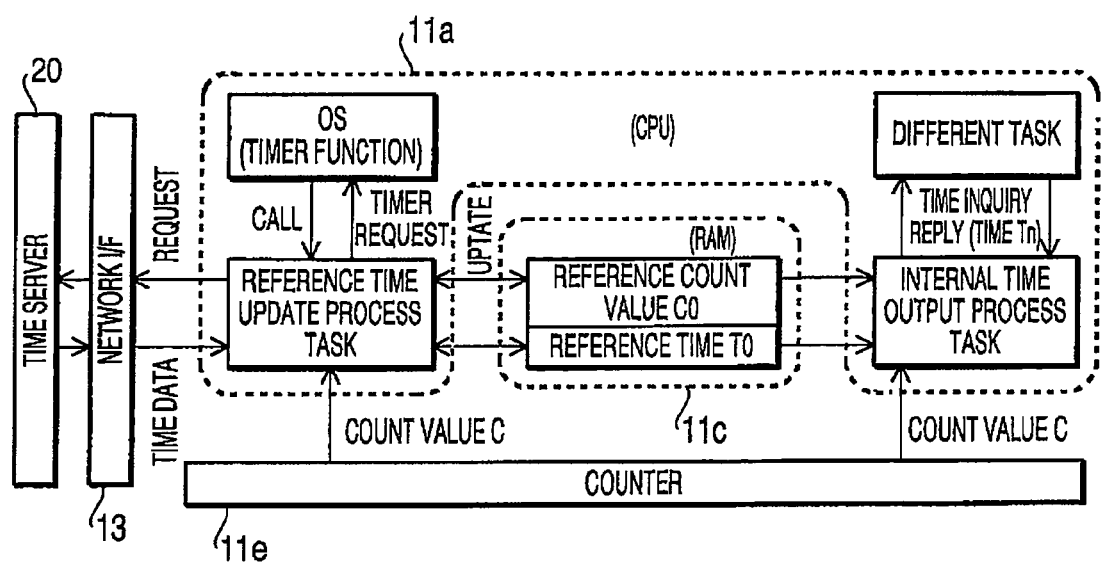
FIG. 6 is a functional block diagram showing processes (tasks) executed by a control unit of an MFP as a modification for implementing the UTC clock function.

Processes (tasks) executed by the control unit 11 of the MFP 10 as the modification for implementing the UTC clock function are shown in FIG. 6. As shown in FIG. 6, the control unit 11 (operated by the operating system (OS) having the software timer function) implements the UTC clock function by executing a reference time update process shown in FIG. 8 and an internal time output process shown in FIG. 9 under the control of the OS.

Figure 7:
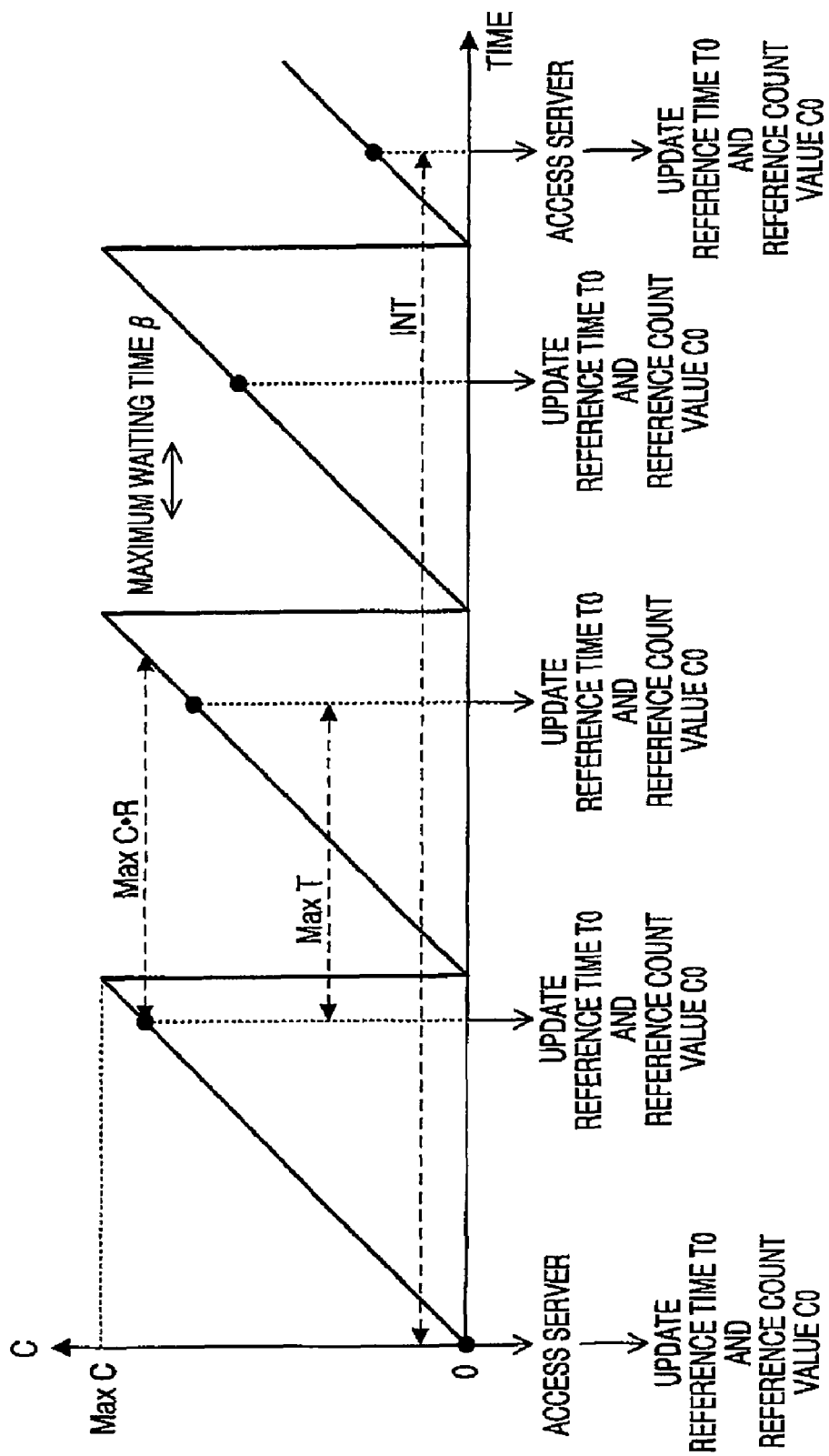
FIG. 7 is a graph showing the operation of a counter of the MFP as the modification.

The operation of the counter 11e of the MFP 10 as the modification is shown in FIG. 7. As shown in FIG. 7, the counter 11e in the modification is a free-running counter which initializes its count value C to the initial value when the count value C has run through its entire range and thereafter continues the counting operation.

Thus, instead of resetting the counter 11e in the reference time update process, the control unit 11 stores the count value C at the point of the update of the reference time T0 in the RAM 11c as a reference count value C0 and calculates the elapsed time ΔT since the update of the reference time T0 by calculating the difference (C−C0) between the (current) count value C and the reference count value C0.

The calculation of the difference (C−C0) is executed by a bit operation using numeric representation without the negative sign "−". For example, although the difference (C−C0) equals 2 similarly to the normal arithmetic operation when C=10 and C0=8, the difference (C−C0) equals (MaxC+8)−10=MaxC−2 when C=8 and C0=10.

Figure 8:
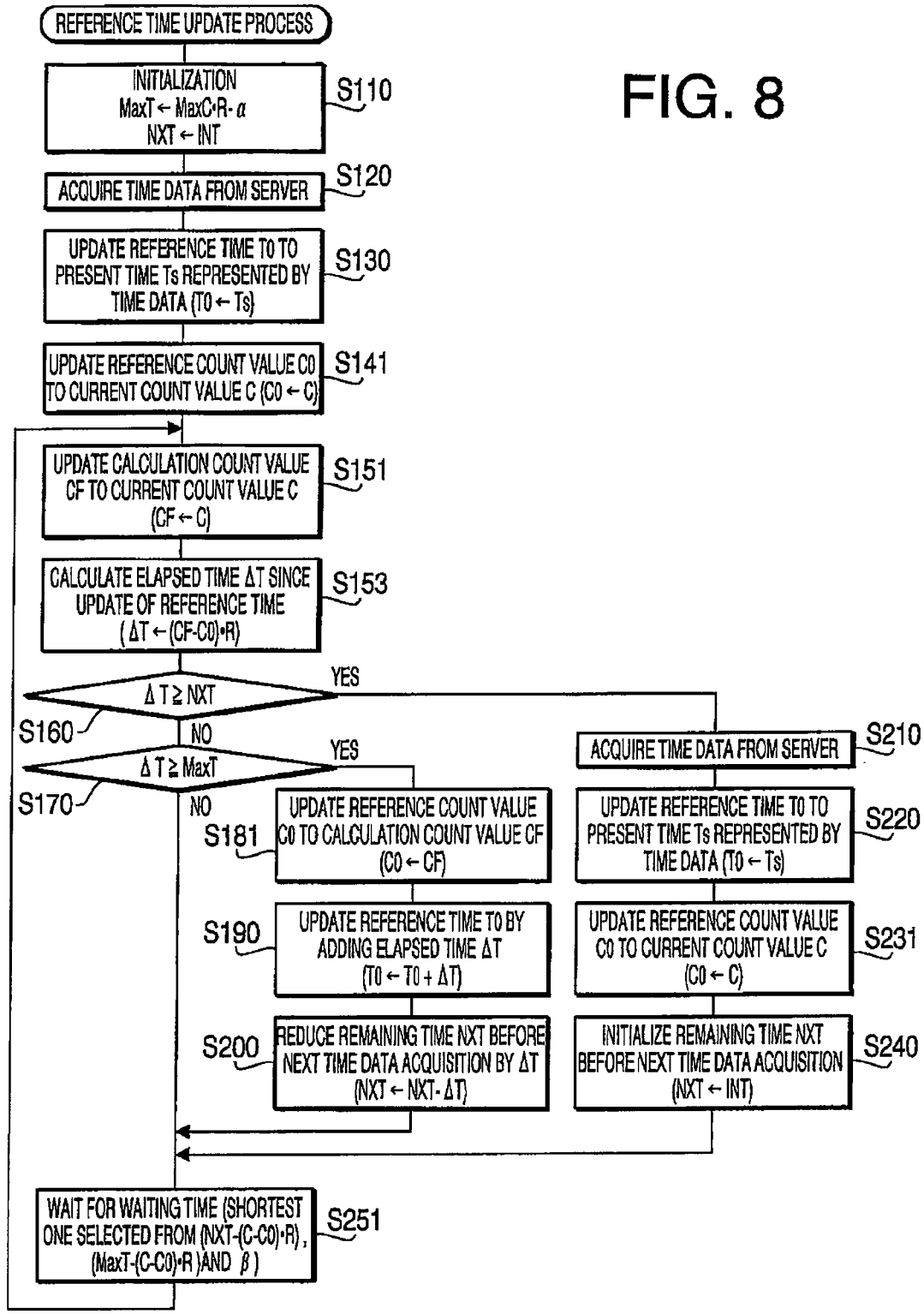
FIG. 8 is a flow chart showing a reference time update process which is executed by the control unit of the MFP as the modification.

Next, the details of the reference time update process in the modification will be explained below referring to a flow chart of FIG. 8. In FIG. 8, steps identical with those in FIG. 4 are assigned the same step numbers.

At the start of the reference time update process (modification), the control unit 11 initializes the parameters (MaxT←MaxC·R−α, NXT←INT) similarly to the above embodiment (S110). The time α and the maximum waiting time β are identical with those in the above embodiment.

After finishing the initialization (S110), the control unit 11 acquires the time data from the time server 20 via the network interface 13 (S120) and thereafter updates the reference time T0 stored in the RAM 11c to the present time Ts represented by the received time data (S130).

Subsequently, instead of resetting the counter 11e, the control unit 11 refers to the count value C of the counter 11e and updates the reference count value C0 stored in the RAM 11c to the count value C at the point of the reference (C0←C) (S141). Thereafter, the control unit 11 advances to step S151.

In the step S151, the control unit 11 refers to the count value C of the counter 11e and updates a calculation count value CF (to be used for calculation) stored in the RAM 11c to the count value C at the point of the reference (CF←C).

Subsequently, the control unit 11 calculates the elapsed time ΔT since the update of the reference time T0 based on the calculation count value CF, the reference count value C0 and the incrementation cycle R of the counter 11e as below (S153). Incidentally, the difference (CF−C0) is calculated by the aforementioned bit operation.

$$\Delta T \leftarrow (CF-C0) \cdot R$$

After calculating the elapsed time ΔT (S153), the control unit 11 advances to the step S160 and judges whether the time INT has passed since the previous time data acquisition or not by judging whether or not the elapsed time ΔT is the remaining time NXT or more.

If the elapsed time ΔT is less than the time NXT (S160: NO), the control unit 11 advances to the step S170 and judges whether or not the elapsed time ΔT is the time MaxT or more, that is, whether or not the time MaxT has passed since the update of the reference time T0.

If the elapsed time ΔT is less than the time MaxT (S170: NO), the control unit 11 advances to step S251. In the step S251, the control unit 11 refers to the count value C of the counter 11e, calculates a remaining time (NXT−(C−C0)·R) before the next time data acquisition, calculates a remaining time (MaxT−(C−C0)·R) before the next update of the reference time T0, determines a waiting time WT as the shortest one selected from the calculated remaining time (NXT−(C−C0)·R), the calculated remaining time (MaxT−(C−C0)·R) and the maximum waiting time β, and thereafter waits for the determined waiting time WT by use of the software timer of the OS similarly to the step S250 in FIG. 4.

When a call from the software timer is received (i.e. when the waiting time WT has passed), the control unit 11 returns to the step S151, in which the control unit 11 newly refers to the count value C of the counter 11e and updates the calculation count value CF stored in the RAM 11c to the count value C at the point of the reference (CF←C). Thereafter, the control unit 11 calculates the elapsed time ΔT using the calculation count value CF (S153) and executes the subsequent steps.

When the time MaxT has passed since the update of the reference time T0, the elapsed time ΔT is calculated in S153 as a time longer or equal to the time MaxT. Thus, the control unit 11 judges in S170 that the elapsed time ΔT is the time MaxT or more (S170: YES) and advances to step S181.

In the step S181, the control unit 11 updates the reference count value C0 stored in the RAM 11c to the calculation count value CF stored in the RAM 11c (C0←CF). Subsequently, the control unit 11 updates the reference time T0 stored in the RAM 11c by adding the elapsed time ΔT to the current value of the reference time T0 as below (S190).

$$T0 \leftarrow T0 + \Delta T$$

Subsequently, the control unit 11 updates the remaining time NXT (before the next time data acquisition from the time server 20) by subtracting the elapsed time ΔT from the current value of the remaining time NXT as below (S200).

$$NXT \leftarrow NXT - \Delta T$$

After finishing the step S200, the control unit 11 advances to the step S251 (waits for the waiting time WT as explained above) and thereafter returns to the step S151.

When the time INT has passed since the previous time data acquisition, the elapsed time ΔT is calculated in S153 as a time longer or equal to the remaining time NXT. Thus, the control unit 11 judges "YES" in S160 and advances to the step S210.

In the step S210, the control unit 11 acquires the time data from the time server 20 similarly to the step S120. After receiving the time data (S210), the control unit 11 updates the reference time T0 stored in the RAM 11c to the present time Ts represented by the received time data (S220), refers to the count value C of the counter 11e and updates the reference count value C0 stored in the RAM 11c to the count value C at the point of the reference (S231), initializes the remaining time NXT to the time INT (S240), and thereafter advances to the step S251.

By executing the above procedure, the control unit 11 makes it possible to determine the present time Tn based on the reference time T0, the reference count value C0 and the count value C until the next time data acquisition.

Figure 9:
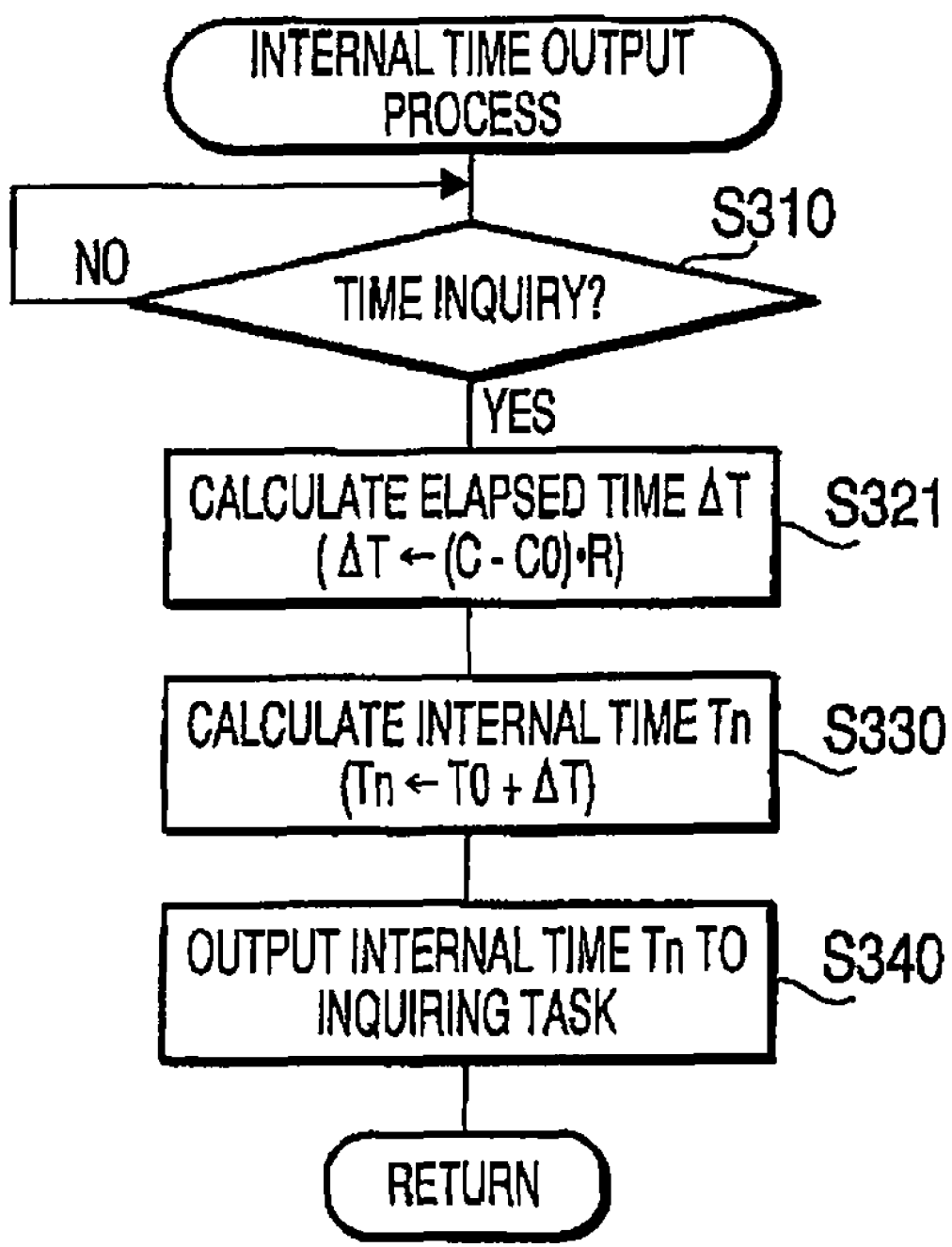
FIG. 9 is a flow chart showing an internal time output process which is executed by the control unit of the MFP as the modification.

Next, the details of the internal time output process in the modification will be explained below referring to a flow chart of FIG. 9. The control unit 11 starts repeatedly executing the internal time output process (FIG. 9) immediately after startup of the MFP 10.

At the start of the internal time output process, the control unit 11 waits until the time inquiry is issued by a task (S310). When a time inquiry is issued (S310:YES), the control unit 11 refers to the count value C of the counter 11e and calculates the elapsed time ΔT since the update of the reference time T0 based on the incrementation cycle R of the counter 11e and the difference (C−C0) between the count value C at the point of the reference and the reference count value C0 stored in the RAM 11c as below (S321).

$$\Delta T \leftarrow (C-C0) \cdot R$$

Subsequently, the control unit 11 calculates the present time Tn (UTC) by adding the calculated elapsed time ΔT to the reference time T0 stored in the RAM 11c (S330) and outputs the calculated present time Tn to the inquiring task (S340). Thereafter, the control unit 11 which has finished the above internal time output process returns to the step S310 and waits until the next time inquiry is issued by a task.

In the embodiment (including the modification) explained above, the present time Tn is obtained (determined) using the counter 11e built in the control unit 11 (microcomputer). Therefore, the present time Tn can be obtained with high accuracy and consequently highly accurate time information can be supplied to the inquirer of the time even without using an RTC (Real Time Clock) circuit.

Thanks to the use of the counter 11e instead of an RTC circuit, the circuit scale can be reduced and an MFP 10 having a highly accurate clock function (timekeeping function) can be manufactured in a simple configuration and at a low cost.

Further, since the MFP 10 in the above embodiment is capable of calculating the present time Tn even when the time data is acquired at time intervals longer than the maximum measurement time of the counter 11*e*, no excessive load on the time server 20 is caused by a short maximum measurement time of the counter 11*e*. Thus, an MFP 10 that is also easy on the time server 20 can be provided by the above embodiment.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, the MFP 10 in the above embodiment may also be configured to inquire of the internal time output process (task) the time (UTC) when a time display button of the display/operation unit 19 is pressed by the user, convert the time (UTC) (obtained from the internal time output process (task) in response to the inquiry) into the local time, and display the local time on the LCD monitor.

What is claimed is:

1. An electronics device comprising:
    a time information acquisition unit configured to acquire time information representing present time from an external device;
    a reference time storage unit configured to store and hold reference time;
    an update unit configured to update the reference time stored in the reference time storage unit to a time represented by most recent time information acquired by the time information acquisition unit each time the time information is acquired by the time information acquisition unit;
    a counter circuit formed by hardware and configured to update its count value at fixed cycles;
    an elapsed time measurement unit configured to measure an elapsed time since the update of the reference time by use of the counter circuit;
    a present time calculation unit configured to calculate present time by adding the elapsed time measured by the elapsed time measurement unit to the reference time stored in the reference time storage unit; and
    a response unit configured to make the present time calculation unit calculate the present time and to output the calculated present time if a present time output request is issued.

2. The electronics device according to claim 1,
    wherein the elapsed time measurement unit includes:
        a reference count value storage unit configured to store and hold a reference count value,
    wherein the elapsed time measurement unit is configured to refer to the count value of the counter circuit and to update the reference count value stored in the reference count value storage unit to the count value of the counter circuit at the point of the reference to the count value each time the reference time is updated by the update unit, and
    wherein the elapsed time measurement unit is configured to measure the elapsed time since the update of the reference time by referring to the count value of the counter circuit and calculating a difference between the count value and the reference count value stored in the reference count value storage unit.

3. The electronics device according to claim 2, further comprising:
    an auxiliary update unit configured to:
        refer to the count value of the counter circuit at time intervals shorter than a maximum measurement time of the counter circuit, the maximum measurement time being a time in which the count value runs through its entire range,
        update the reference time stored in the reference time storage unit to the present time that is determined from the current value of the reference time and the count value at the point of the reference, and
        update the reference count value stored in the reference count value storage unit to the count value of the counter circuit at the point of the reference.

4. The electronics device according to claim 3, wherein the time information acquisition unit is configured to acquire the time information from the external device periodically at time intervals longer than the maximum measurement time.

5. The electronics device according to claim 1, wherein the elapsed time measurement unit is configured to measure the elapsed time since the update of the reference time by referring to the count value of the counter circuit while resetting the count value on each update of the reference time by the update unit.

6. The electronics device according to claim 5, further comprising:
    an auxiliary update unit configured to:
        refer to the count value of the counter circuit at time intervals shorter than a maximum measurement time of the counter circuit, the maximum measurement time being a time in which the count value runs from its starting point entirely up to its endpoint,
        update the reference time stored in the reference time storage unit to the present time determined from the current value of the reference time and the count value at the point of the reference to the count value, and
        reset the count value of the counter circuit after making the reference to the count value.

7. The electronics device according to claim 6, wherein the time information acquisition unit is configured to acquire the time information from the external device periodically at time intervals longer than the maximum measurement time.

8. The electronics device according to claim 1, wherein the time information acquisition unit acquires the time information representing the present time from a time server as a supplier of the time information via a communication interface of the electronic device, wherein the communication interface is capable of communicating with the time server.

9. A non-transitory computer-readable medium storing computer-readable instructions that, when executed, cause a computer to execute:
    a time information acquisition step of acquiring time information representing present time from an external device;
    an update step of updating reference time stored in a reference time storage unit to a time represented by most recent time information acquired by the time information acquisition step each time the time information is acquired by the time information acquisition step;
    an elapsed time measurement step of measuring an elapsed time since the update of the reference time by use of a counter circuit which is formed by hardware and updates its count value at fixed cycles;
    a present time calculation step of calculating present time by adding the elapsed time measured by the elapsed time measurement step to the reference time stored in the reference time storage unit; and a response step of calculating the present time by executing the present time calculation step and outputting the calculated present time if a present time output request is issued.

10. The non-transitory computer-readable medium according to claim 9, wherein the elapsed time measurement step refers to the count value of the counter circuit and updates a reference count value stored in a reference count value storage unit to the count value of the counter circuit at the point of the reference to the count value each time the reference time is updated by the update step, and wherein the elapsed time measurement step measures the elapsed time since the update of the reference time by referring to the count value of the counter circuit and calculating difference between the count value and the reference count value stored in the reference count value storage unit.

11. The non-transitory computer-readable medium according to claim 10, further storing computer-readable instructions that cause the computer to execute an auxiliary update step of referring to the count value of the counter circuit at time intervals shorter than a maximum measurement time of the counter circuit, the maximum measurement time being a time in which the count value runs through its entire range, updating the reference time stored in the reference time storage unit to the present time determined from the current value of the reference time and the count value at the point of the reference to the count value, and updating the reference count value stored in the reference count value storage unit to the count value of the counter circuit at the point of the reference.

12. The non-transitory computer-readable medium according to claim 11, wherein the time information acquisition step acquires the time information from the external device periodically at time intervals longer than the maximum measurement time.

13. The non-transitory computer-readable medium according to claim 9, wherein the elapsed time measurement step measures the elapsed time since the update of the reference time by referring to the count value of the counter circuit while resetting the count value on each update of the reference time by the update step.

14. The non-transitory computer-readable medium according to claim 13, further storing computer-readable instructions that cause the computer to execute an auxiliary update step of referring to the count value of the counter circuit at time intervals shorter than a maximum measurement time of the counter circuit, the maximum measurement time being a time in which the count value runs from its starting point entirely up to its endpoint, updating the reference time stored in the reference time storage unit to the present time that is determined from the current value of the reference time and the count value at the point of the reference to the count value, and resetting the count value of the counter circuit after making the reference to the count value.

15. The non-transitory computer-readable medium according to claim 14, wherein the time information acquisition step acquires the time information from the external device periodically at time intervals longer than the maximum measurement time.

16. The non-transitory computer-readable medium according to claim 9, wherein the time information acquisition step acquires the time information representing the present time from a time server as a supplier of the time information via a communication interface which is capable of communicating with the time server.

17. An apparatus comprising:

a processor; and memory operatively coupled to the processor and storing computer readable instructions that, when executed, cause the apparatus to:

acquire time information representing present time from an external device;

store and hold a reference time in a reference time storage;

update the reference time stored in the reference time storage to a time represented by most recently acquired time information each time the time information is acquired;

measure an elapsed time since the update of the reference time by use of a counter circuit; and if a present time output request is issued:

calculate present time by adding the measured elapsed time to the stored reference time; and output the calculated present time.

* * * * *